United States Patent [19]
Locke

[11] Patent Number: 5,738,407
[45] Date of Patent: Apr. 14, 1998

[54] HEAD RESTRAINT AIRBAG ASSEMBLY

[75] Inventor: Gerald S. Locke, Lake Orion, Mich.

[73] Assignee: Lear Corporation, Southfield, Mich.

[21] Appl. No.: 783,223

[22] Filed: Jan. 14, 1997

[51] Int. Cl.$^6$ .................................................. B60R 21/22
[52] U.S. Cl. .............................. 297/216.12; 297/216.13; 280/730.1
[58] Field of Search .......................... 297/216.1, 216.12, 297/216.13; 280/730.1

[56] References Cited

U.S. PATENT DOCUMENTS 3,703,313  11/1972  Schiesterl et al. ............... 280/730.1 X
3,779,577  12/1973  Wilfert ................................ 280/730.1
5,536,043  7/1996  Lang et al. ........................ 280/730.1 X
5,556,129  9/1996  Coman et al. ................. 297/216.12 X

FOREIGN PATENT DOCUMENTS 2152202  4/1973  Germany .......................... 297/216.12
2841729  4/1980  Germany .......................... 280/730 R Primary Examiner—Peter R. Brown
Attorney, Agent, or Firm—Brooks & Kushman P.C.

[57] ABSTRACT

A vehicle seat assembly includes a seat back frame and a headrest movable with respect to the back frame. An airbag is positioned on the back frame and deployable vertically with respect to the back frame such that the airbag is positioned forward-in-vehicle from the headrest when fully deployed.

9 Claims, 1 Drawing Sheet

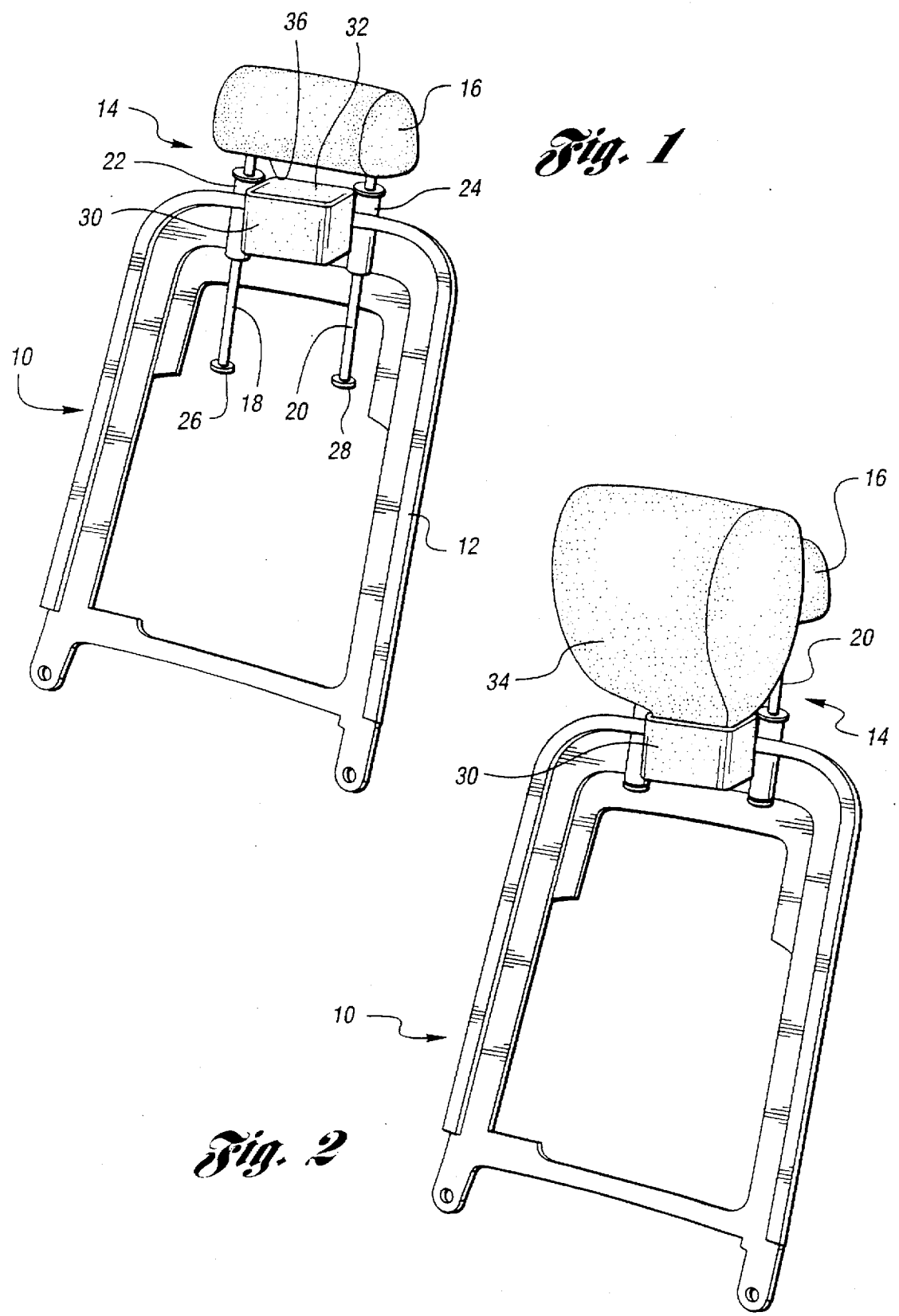

HEAD RESTRAINT AIRBAG ASSEMBLY

TECHNICAL FIELD

The present invention relates to an airbag assembly for deployment adjacent a vehicle seat headrest.

BCAKGROUND OF THE INVENTION

Rear impacts in vehicles may result in occupant injury if the seat headrest is not properly positioned by the vehicle occupant. It is estimated that 70–90% of adjustable head restraints are not properly positioned by vehicle occupants for support in a rear end collision.

The dynamic mechanism which causes neck injuries in automobile accidents is still being researched and debated, however, efforts are being made to reduce the motion of the occupant's head relative to the thorax in a high energy impact to potentially reduce such injuries.

One known product utilizes the force of the thorax penetrating into the seat back to work a mechanism which raises the head restraint and moves it forward. While this system may reduce the head displacement and velocity relative to the thorax, the head and restraint may be moving in opposite directions at impact. Accordingly, while this product provides an improvement, it is not a complete solution to the problem.

Accordingly, it is desirable to provide a vehicle seat assembly design which reduces head displacement and absorbs energy in a rearward vehicle impact.

SUMMARY OF THE INVENTION

In Lear Corporation's continuous efforts to improve vehicle safety, the present invention has been developed to address the above-referenced problems resulting from the vehicle occupant's failure to properly adjust the vehicle head restraint system. In order to accomplish this objective, the present invention provides an airbag positioned with respect to the seat back frame and headrest such that the airbag is deployable to a position forward-in-vehicle from the headrest when fully deployed in order to limit head displacement and absorb energy in a rearward impact.

More specifically, the present invention provides a vehicle seat assembly, comprising a seat back frame and a headrest movable with respect to the back frame. An airbag is positioned on the back frame and deployable vertically with respect to the back frame such that the airbag is positioned forward-in-vehicle from the headrest when fully deployed.

In a preferred embodiment, the airbag is positioned with respect to the headrest such that it engages the headrest when deployed and forces the headrest upward so that the headrest is in proper position in a high energy impact. The headrest is mounted to a pair of posts which are slidable in a corresponding pair of sleeves mounted to the seat back frame. The posts each include a post stop engageable with the respective sleeve to limit movement of the headrest away from the back frame.

Accordingly, an object of the present invention is to provide a vehicle head restraint system which reduces head displacement and absorbs energy in a rearward impact.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 shows a perspective view of a seat back frame and head restraint assembly in accordance with the present invention; and FIG. 2 shows a perspective view of the seat back frame and head restraint assembly of FIG. 1 with the airbag in the fully deployed position.

DETAILED DESCRIPTION OF THE PREFERRED EMBODIMENT

Referring to FIGS. 1 and 2, a vehicle seat assembly 10 is shown in accordance with the present invention. The vehicle seat assembly 10 includes a seat back frame 12 with a head restraint assembly 14 mounted thereto. The head restraint assembly 14 includes a headrest 16 which is mounted to a pair of posts 18, 20, which are slidable within a corresponding pair of sleeves 22, 24. The sleeves 22, 24 are mounted to the seat back frame 12. The posts 18, 20 each include a post stop 26, 28 which is engageable with the lower end of the respective sleeve 22, 24 for limiting movement of the headrest 16 away from the back frame 12.

The restraint assembly 14 further comprises an airbag module 30 having an airbag module door 32 which is openable in a direction toward the headrest 16. An airbag 34 is stored within the airbag module 30. A source of compressed gas is provided within the airbag module 30 for deployment of the airbag 34.

The airbag module is mounted on top of the seat back frame 12 directly under the adjustable headrest 16. The compressed gas is released by either a mechanical trigger within the module 30 or electronically by means of a remote electronic sensor at the base of the seat, or elsewhere in the vehicle, used in conjunction with a controller. The appropriate "g" level for deployment and the shape of the airbag will be tailored to the specific vehicle and seat characteristics.

The initial stage of deployment of the airbag 34 causes the airbag 34 to engage the bottom surface 36 of the headrest 16 and force the headrest 16 away from the back frame 12 by sliding the posts 18, 20 within the respective sleeves 22, 24 until the respective stops 26, 28 are bottomed out against the end of the sleeves 22, 24, thereby properly positioning the headrest 16 for head support in a high energy impact. This fully deployed position is illustrated in FIG. 2, wherein the headrest 16 has been moved to its highest position, and the airbag 34 is deployed forward in vehicle from the headrest 16 to limit head movement and absorb energy in a rearward impact.

Accordingly, in the fully deployed position, the headrest 16 has been moved to its highest position, and the gap between the head and the head restraint assembly 14 has been reduced accordingly. The raised headrest 16 provides the necessary reaction force required for the deployed airbag 34.

In operation, the airbag 34 will be completely deployed before head contact, and provides a stationary (relative to the seat back) and compliant surface which will minimize head displacement and velocity of the head relative to the thorax, thus minimizing the resulting forces in the neck region. An additional benefit of this design is the reduction of head acceleration and axial torque on the neck by allowing head penetration and inducing lateral support.

If the headrest is already in the fully up position when the airbag is triggered, the door 32 on the airbag module 30 will steer the deploying airbag 34 to the front of the headrest 16.

Another advantage of the present invention is that the deployed airbag 34 also supports the neck in the area between the top of the seat back and the bottom 36 of the headrest 16.

While the best mode for carrying out the invention has been described in detail, those familiar with the art to which this invention relates will recognize various alternative designs and embodiments for practicing the invention within the scope of the appended claims.

What is claimed is:

1. A vehicle seat assembly, comprising:

a seat back frame;

a headrest movable with respect to the back frame; and an airbag positioned on the back frame and deployable vertically with respect to the back frame such that the airbag is positioned forward-in-vehicle from the headrest when fully deployed, wherein said airbag is positioned beneath the headrest such that the airbag will engage the headrest when deployed to force the headrest upward, thereby properly positioning the headrest for head support in a high-energy impact.

2. The vehicle seat assembly of claim 1, wherein said airbag is stored in an airbag module having a door which is openable in a direction toward the headrest.

3. The vehicle seat assembly of claim 2, wherein said headrest is mounted on a pair of headrest posts which are slidable within a corresponding pair of sleeves mounted to the seat back frame.

4. The vehicle seat assembly of claim 3, wherein each said post comprises a post stop engageable with the respective sleeve to limit movement of the headrest away from the back frame.

5. A vehicle seat assembly, comprising:

a seat back frame;

a headrest movable with respect to the back frame; and an airbag positioned with respect to the back frame and headrest such that the airbag is deployable to a position forward-in-vehicle from the headrest when fully deployed, wherein said airbag is positioned beneath the headrest such that the airbag will engage the headrest when deployed to force the headrest upward, thereby properly positioning the headrest for head support in a high-energy impact.

6. The vehicle seat assembly of claim 5, wherein said airbag is stored in an airbag module secured to the seat back frame and includes a door which is openable in a direction toward the headrest.

7. The vehicle seat assembly of claim 6, wherein said headrest is mounted on a pair of headrest posts which are slidable within a corresponding pair of sleeves mounted to the seat back frame.

8. The vehicle seat assembly of claim 7, wherein each said post comprises a post stop engageable with the respective sleeve to limit movement of the headrest away from the back frame.

9. A vehicle seat assembly, comprising:

a seat back frame;

a headrest movable with respect to the back frame;

an airbag module secured to the back frame beneath the headrest and having a door which is openable in a direction toward the headrest; and an airbag positioned within the airbag module and deployable vertically with respect to the back frame such that the airbag engages the headrest and forces the headrest away from the back frame as the airbag is deployed, and is positioned forward-in-vehicle from the headrest when fully deployed.

* * * * *